(12) United States Patent
Hutt et al.

(10) Patent No.: US 10,996,489 B2
(45) Date of Patent: *May 4, 2021

(54) SPECTACLES WITH DUAL SALON AND TRADITIONAL CONFIGURATIONS

(71) Applicant: Bunny Eyez, LLC, Bethpage, NY (US)

(72) Inventors: Jennifer Hutt, Roslyn Harbor, NY (US); Stacy Fritz, Roslyn Harbor, NY (US); Andrea Gluck, Bethpage, NY (US)

(73) Assignee: Bunny Eyez, LLC, Bethpage, NY (US)

( * ) Notice: Subject to any disclaimer, the term of this patent is extended or adjusted under 35 U.S.C. 154(b) by 85 days.

This patent is subject to a terminal disclaimer.

(21) Appl. No.: 16/207,334

(22) Filed: Dec. 3, 2018

(65) Prior Publication Data

US 2019/0250427 A1 Aug. 15, 2019

Related U.S. Application Data

(63) Continuation-in-part of application No. 15/995,625, filed on Jun. 1, 2018, now Pat. No. 10,663,758, which is a continuation-in-part of application No. 29/636,664, filed on Feb. 9, 2018, now Pat. No. Des. 863,416.

(51) Int. Cl.
*G02C 5/22* (2006.01)
(52) U.S. Cl.
CPC .................. *G02C 5/2263* (2013.01)
(58) Field of Classification Search
CPC ... G02C 5/006; G02C 5/2263; G02C 2200/18
See application file for complete search history.

(56) References Cited

U.S. PATENT DOCUMENTS

| D50,385 | S | 2/1917 | Heckroth |
|---|---|---|---|
| D206,291 | S | 11/1966 | Nordhoff |
| D208,437 | S | 8/1967 | Kono |
| 4,547,048 | A | 10/1985 | Negishi |
| D308,876 | S | 6/1990 | Piper |
| 5,187,504 | A | 2/1993 | Kanda |
| 5,229,795 | A | 7/1993 | Heintzelman |
| 5,321,442 | A | 6/1994 | Albanese |
| 5,751,393 | A | 5/1998 | Yamazaki |
| D427,227 | S | 6/2000 | Conway |

(Continued)

FOREIGN PATENT DOCUMENTS

| CN | 203838428 U | 9/2014 |
|---|---|---|
| CN | 203838432 U | 9/2014 |

(Continued)

OTHER PUBLICATIONS

Corinne, "Spectacles With Removable Snap-Fit Temples", WO 2015071617, machine translation. (Year: 2015).*

(Continued)

*Primary Examiner* — Wen Huang
(74) *Attorney, Agent, or Firm* — Schott, P.C.

(57) ABSTRACT

The multiuse eyeglasses include a frame that holds two lenses and arms that extend from the frame. The arms include a first axis of rotation that is generally perpendicular to the arms and a second axis of rotation that is orthogonal to the first axis of rotation and allows the arms to be rotated downwards relative to the frame.

11 Claims, 9 Drawing Sheets

(56) References Cited

U.S. PATENT DOCUMENTS

| | | | |
|---|---|---|---|
| 6,102,541 A | 8/2000 | Kuo | |
| 6,464,353 B1 | 10/2002 | Spindelbalker | |
| 6,719,425 B2 | 4/2004 | Conner | |
| 6,752,496 B2 | 6/2004 | Conner | |
| D492,492 S | 7/2004 | Richard | |
| 6,817,710 B2 | 11/2004 | Benavides et al. | |
| D616,484 S | 5/2010 | Inui | |
| 8,210,676 B1 | 7/2012 | Hunt | |
| 8,517,532 B1 | 8/2013 | Hicks et al. | |
| D709,122 S | 7/2014 | Markovitz et al. | |
| D718,372 S | 11/2014 | Markovitz et al. | |
| 8,992,009 B2 | 3/2015 | Austin | |
| 9,541,771 B2 | 1/2017 | Johnson | |
| 2008/0074609 A1 | 3/2008 | Ifergan | |
| 2015/0092153 A1 | 4/2015 | Smith | |
| 2016/0091731 A1 | 3/2016 | Zhou | |
| 2016/0341976 A1 | 11/2016 | Ku | |
| 2018/0095294 A1 | 4/2018 | Johnson | |

FOREIGN PATENT DOCUMENTS

| | | |
|---|---|---|
| CN | 204116732 U | 1/2015 |
| CN | 204241778 U | 4/2015 |
| CN | 204273511 U | 4/2015 |
| CN | 104460035 B | 6/2016 |
| CN | 105629501 A | 6/2016 |
| CN | 205333985 U | 6/2016 |
| CN | 205353475 U | 6/2016 |
| CN | 205353479 U | 6/2016 |
| CN | 205353480 U | 6/2016 |
| CN | 205353484 U | 6/2016 |
| CN | 205384413 U | 7/2016 |
| CN | 205485099 U | 8/2016 |
| CN | 205485106 U | 8/2016 |
| CN | 205512966 U | 8/2016 |
| CN | 205539771 U | 8/2016 |
| CN | 205562994 U | 9/2016 |
| CN | 205643926 U | 10/2016 |
| CN | 206892473 U | 1/2018 |
| CN | 107656378 A | 2/2018 |
| CN | 207067554 U | 3/2018 |
| CN | 207067555 U | 3/2018 |
| CN | 207133529 U | 3/2018 |
| CN | 207281396 U | 4/2018 |
| CN | 207488638 U | 6/2018 |
| JP | 2014-206713 A | 10/2014 |
| KR | 10-2009-0047255 A | 5/2009 |
| KR | 10-2010-0133625 A | 12/2010 |
| KR | 10-1041556 B1 | 6/2011 |
| KR | 10-2013-0013290 A | 2/2013 |
| KR | 10-2014-0060125 A | 5/2014 |
| WO | WO-2015071617 A1 * | 5/2015 ........... G02C 5/2209 |
| WO | 2016/121612 A1 | 8/2016 |
| WO | 2017/003226 A1 | 1/2017 |
| WO | 2019/156704 A1 | 8/2019 |

OTHER PUBLICATIONS

"Koo Open Cube half rim sunglasses," posted at bikerumor.com, Posting date Aug. 22, 2017, accessed at https://bikerumor.com/2017/08/22/kask-opens-koo-open-cube-half-rim-sunglasses, accessed on May 17, 2019, pp. 5.

"Nannini Compact One Optics," Posted at amazon.com, Posting date by Nov. 25, 2011, accessed at https://www.amazon.com/Nannini-Compact-Optics-Temples-Reading/dp/B006DY67DQ, accessed on May 17, 2019, pp. 10.

"Twist ONE Read Flat Folding Reading Glasses," Posted at amazon.com, Posting Date by Mar. 19, 2015, accessed at https://www.amazon.com/Twist-Folding-Reading-Glasses-Smoke/dp/B00J85NY60, accessed on May 17, 2019, pp. 8.

"Viva7 slimfold reading glasses," Posted at global.rakuten.com, accessed at https://global.rakuten.com/en/store/viva7/item/1936005/, accessed on May 17, 2019, pp. 9.

"Welcome to Bunny Eyez," Posted at web.archive.org, Posting Date Aug. 18, 2018, accessed at http://web.archive.org/web/20180818124756/https://bunnyeyez.com/, accessed on May 17, 2019, pp. 6.

International Search Report and Written Opinion of the International Searching Authority for PCT Application No. PCT/US2018/038417 dated Aug. 22, 2018.

Aspex, "Eyewear group," accessed at https://aspexeyewear.com/en/catalogsearch/advanced/result/?other_technology1[]=663, accessed on Nov. 30, 2018, pp. 4.

TurboFlex, EasyClip Eyewear, Published on Dec. 15, 2016, accessed at https://www.youtube.com/watch?time_continue=28&v=C1Bc2zLtYWI, accessed on Nov. 30, 2018, p. 1.

Notice of Allowance received for U.S. Appl. No. 29/636,664, dated Jun. 12, 2019, 9 pages.

Notice of Allowance received for U.S. Appl. No. 15/995,625, dated Apr. 15, 2020, 9 pages.

* cited by examiner

SPECTACLES WITH DUAL SALON AND TRADITIONAL CONFIGURATIONS

BACKGROUND

Figure 1:
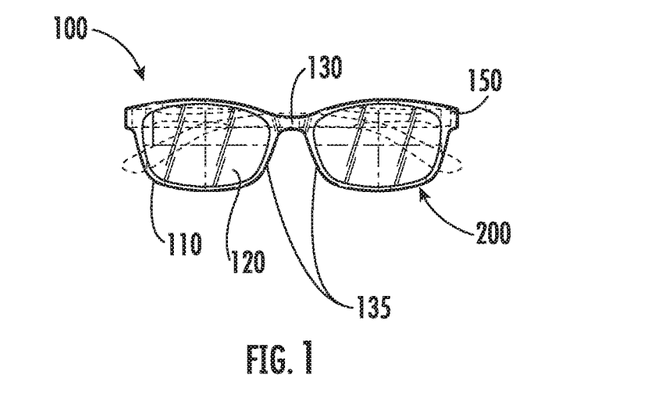
FIG. 1 shows a front elevation view of the multiuse eyeglasses in the traditional folded position.
Figure 2:
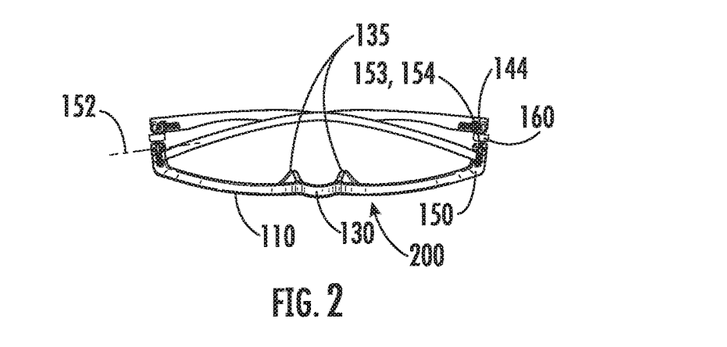
FIG. 2 shows a top view of the multiuse eyeglasses in the traditional folded position.
Figure 3:
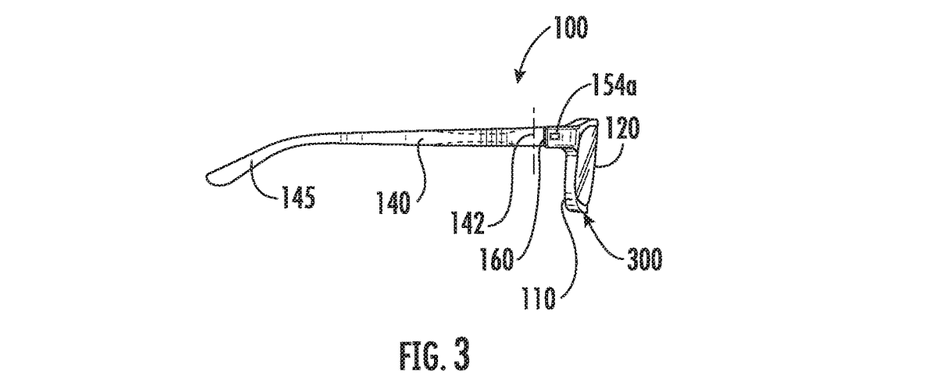
FIG. 3 shows a side view of the multiuse eyeglasses in the traditional extended position.

Traditional eyeglasses have two positions: A folded position and an extended position. FIGS. 1 and 2 show the former and FIG. 3 shows the later. The folded position is for eyeglass transportation and storage. In the extended position, the eyeglass arm earpiece loops over and behind the wearer's ear, securing the glasses to the wearer's face. This is so convenient that the design is little-changed from its early 1700s introduction by Edward Scarlett and James Ayscough, who invented eyeglass arms and their foldability respectively in 1730 and 1752.

The traditional eyeglass advantage is not only that it holds the lenses in front of the eyes while the wearer's hands are free, but it also holds the lenses in a plane in front of the wearer's eyes, allowing a user to move their eyes and retain the same optical advantage through the lenses.

One of the problems with early eyeglass designs is that as people age, they become more far-sighted and may thus lose both their ability to see near and far. Such a challenge presented a challenge to early eyeglass manufacturers, who could only produce one appropriate lens to help their wearers. As is widely known, America's famous polymath Benjamin Franklin solved this problem with his invention of the bifocals in the mid to late 1700s.

In roughly the same time period, George Adams invented the lorgnette spectacle that had no arms but instead included a handle that allowed the user to place the corrective lenses in front of their eyes in use and remove them when not. These types of glasses proved popular in theater settings and masquerades.

Each of these inventions, the traditional, the bifocal, and the lorgnette eyeglasses share certain challenges that no single eyeglass addresses. The traditional eyeglass works well but in situations where a user's ears are not accessible (during hair dying, hair drying, surgery, etc.), a person does not want to give up their ability to see and read. The bifocal (and today's progressive lenses) solve the challenge of those who want to see both near and far, but a person who wants to look over their glasses must allow the glasses to slide down their nose to look over them, in a stereotypically "disapproving teacher" pose. This way of wearing glasses down-the-nose makes them prone to falling off. Finally, the lorgnette, while stylish and functional in the hair salon, has a valuable functionality but people only call upon in certain circumstances.

Thus, there is a need for a stylish yet functional eyeglass design that solves some or all of the above challenges.

SUMMARY OF THE EMBODIMENTS

The multiuse eyeglasses include a frame that holds two lenses and arms that extend from the frame. The arms include a first axis of rotation that is generally perpendicular to the arms and a second axis of rotation that is orthogonal to the first axis of rotation and allows the arms to be rotated downwards relative to the frame.

BRIEF DESCRIPTION OF THE DRAWINGS

Certain dashed lines within the figures are meant to show hidden features or moving/adjustable elements, and some elements may have been shown enlarged or reduced in order to show details.

DETAILED DESCRIPTION OF THE EMBODIMENTS

The multiuse eyeglasses 100 described herein move between a traditional folded configuration 200 (FIGS. 1 and 2), traditional extended configuration 300 (FIGS. 3 and 4), hybrid extended configuration (500), and lorgnette (or "salon") extended configuration 600 (FIGS. 6-9). Hybrid folded and lorgnette folded configurations are also possible by folding in the arms; these configurations may be useful when attempting to fold the eyeglasses to fit into certain spaces.

Figure 4:
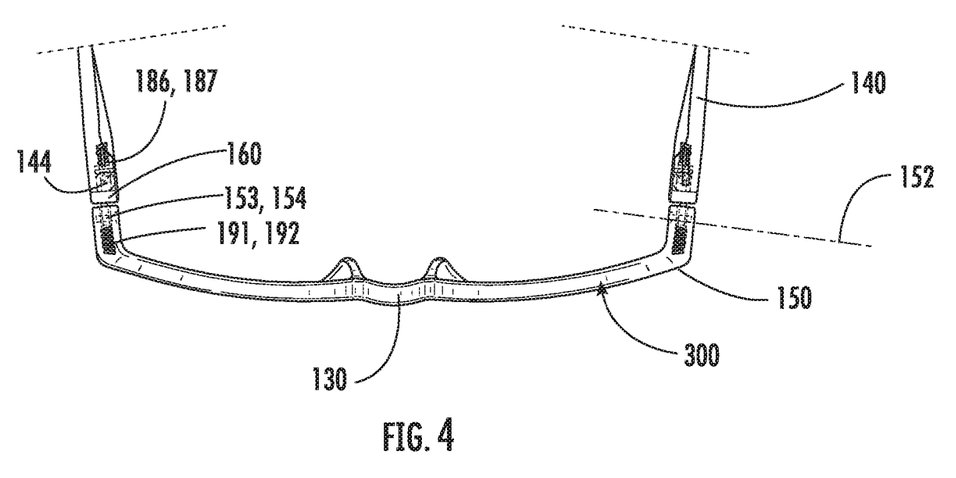
FIG. 4 shows a top view of the multiuse eyeglasses in the traditional extended position.

As best seen in FIGS. 3 and 4, the arms 140 have a first axis of rotation 142 that is generally perpendicular to the arms 140 and a second axis of rotation 152 that is orthogonal to the first axis of rotation 142 and allows the arms 140 to be rotated downwards relative to the frame 110.

With reference to all of the figures, although some figures show certain components more clearly than others, the traditional eyeglasses 100 parts are readily recognizable. The eyeglass frames 110 hold lenses 120 separated by a bridge 130 with a nosepiece 135. The eyeglass frames 110 may come in many styles and the one shown is merely for illustrative purposes and is in no way limiting to the extension of the application to other frame styles.

Arms or temples 140 attach the eyeglass frames 110 at end pieces 150. The arms 140 may have tips 145 that wrap around and behind a wearer's ear.

Figure 10:
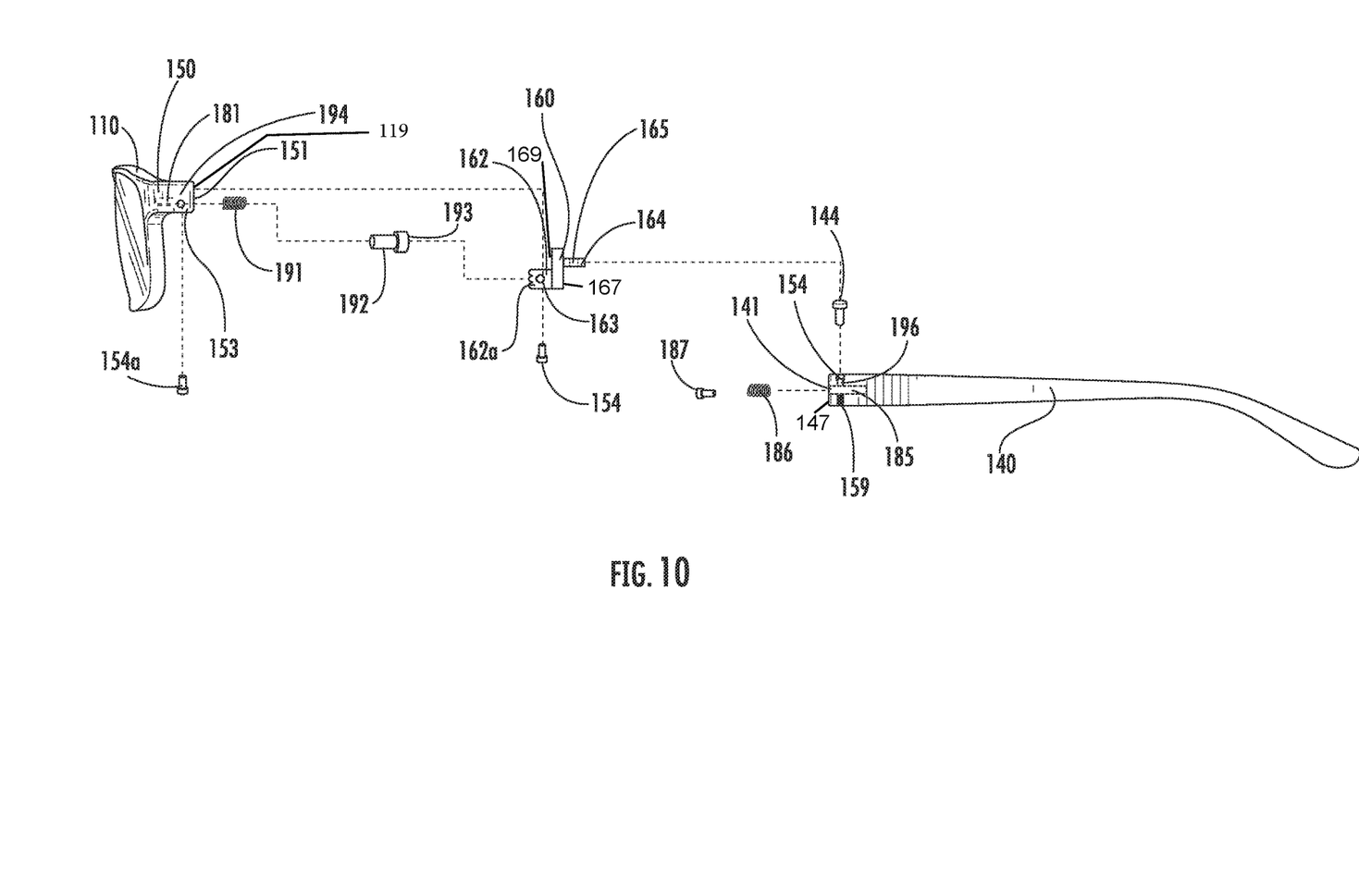
FIG. 10 shows a side exploded view of the multiuse eyeglasses, with certain attachment elements shown in profile.
Figure 11:
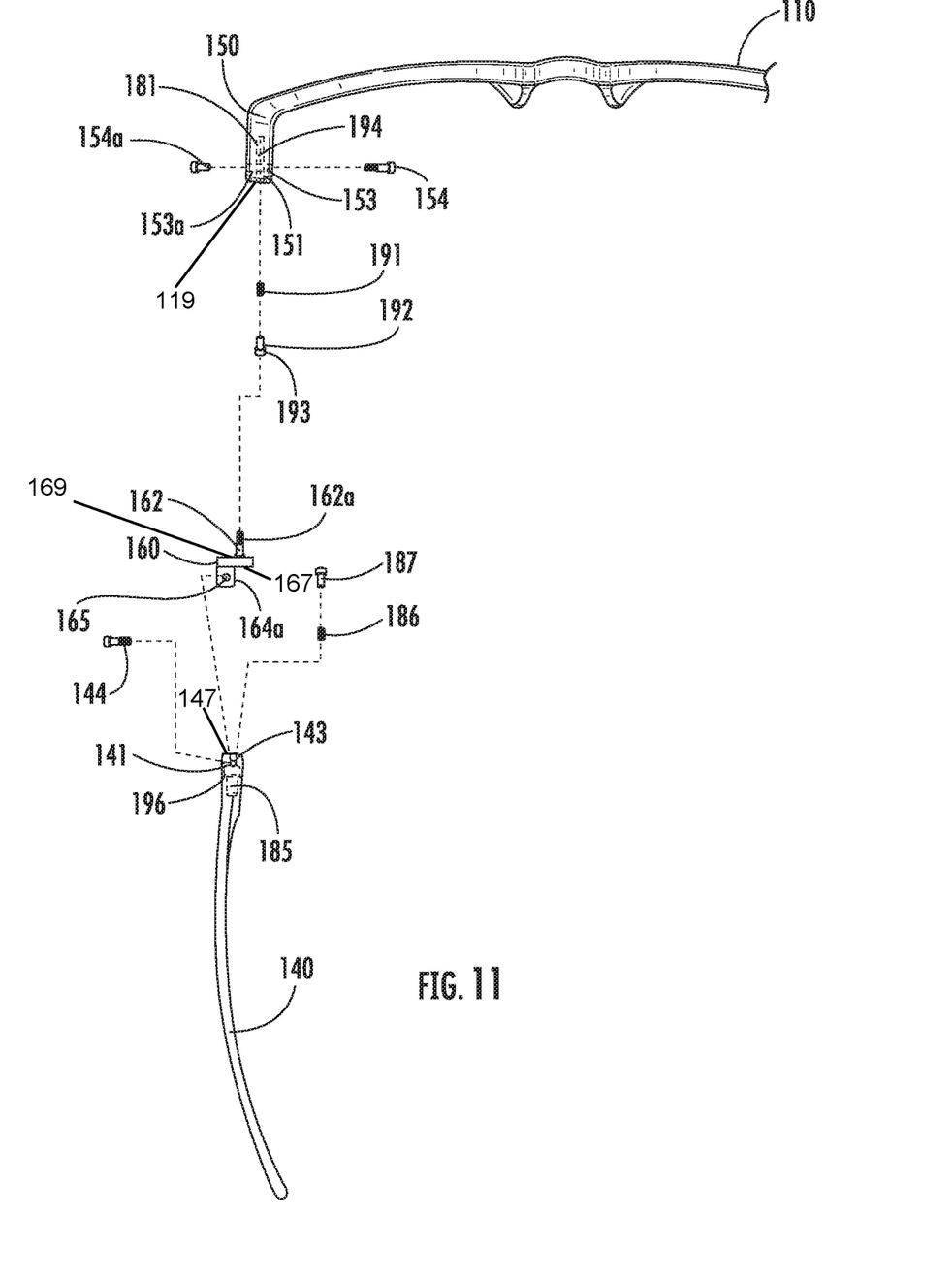
FIG. 11 shows a top exploded view of the multiuse eyeglasses, with certain attachment elements shown in profile.

The multiuse eyeglasses 100 may include a hinge element 160 that joins the frame 110 to the arms 140 and may be best appreciated in the exploded views of FIGS. 10 and 11. The hinge element 160 (shown inverted with the hinge element arm engagement portion 164 facing away from lenses 120 though it would be appreciated that when assembled, such portion 164 would be oriented further from the lenses 120 as shown in FIG. 4) may include a frame engagement portion 162 that engages the frame 110 and an arm engagement portion 164 that engages the arms 140. The hinge element 160 engages the frame 110 through a hinge receiving slot 151 that receives the frame engagement portion 162, and it engages the arms 140 through a hinge receiving channel 141 that receives the arm engagement portion 164.

The frame 110 may further include a frame pivot screw receiving hole 153 that receives a frame pivot screw 154 that defines the second axis of rotation 152 (and allows the glasses to move between the traditional and lorgnette positions). The frame pivot screw 154 may be threaded at its terminal end to engage the threading on the frame 110 or as shown, it may engage an internally threaded nut 154a.

The arms 140 may include arm pivot screw receiving holes 143 that receive arm pivot screws 144 that define the first axis of rotation 142. The arm pivot screws 144 may engage a nut or the arm pivot screw receiving holes 143 may have internal threading 159 at an end thereof to engage the screws 144.

These holes 153, 143 are best seen in the exploded views and may include a shelf 165 or 196 that engages biasing pins to be discussed hereafter.

Tracing the path of engagement of the frame pivot screw 154, the frame pivot screw 154 passes through a first portion of the frame pivot screw receiving hole 153, through a hinge element frame pivot screw receiving hole 163 and into a second portion of the frame pivot screw receiving hole 153 or the internally threaded nut 154a.

Similarly tracing the path of the arm pivot screw 144, the arm pivot screw 144 passes through a first portion of the arm pivot screw receiving hole 143, through a hinge element arm pivot screw receiving hole 165 and into a second portion of the arm pivot screw receiving hole 143 another internally threaded nut. As the arm 140 rotates about the arm pivot screw 144, its motion towards the frame 110 is free until it encounters the other folded arm 140 or the frame 110 itself in the folded configuration. Similarly, movement of the arms 140 beyond their traditional extended positions around the arm pivot screw 140 shown in FIG. 4 is prevented by contact between an arm front face 147 of the arm 140 against an arm-facing hinge face 167 of the hinge element 160 beyond which further outwards motion of the arm 140 away from the frame 110 is not possible except through bending the arm 140, frame, 110, or hinge element 160. Upwards motion of the arm 140 about the frame pivot screw 154 beyond what is shown in the extended traditional configuration of FIG. 4 is prevented by contact between a frame-facing face 169 of the hinge element 160 and a frame end face 119.

Figure 5:
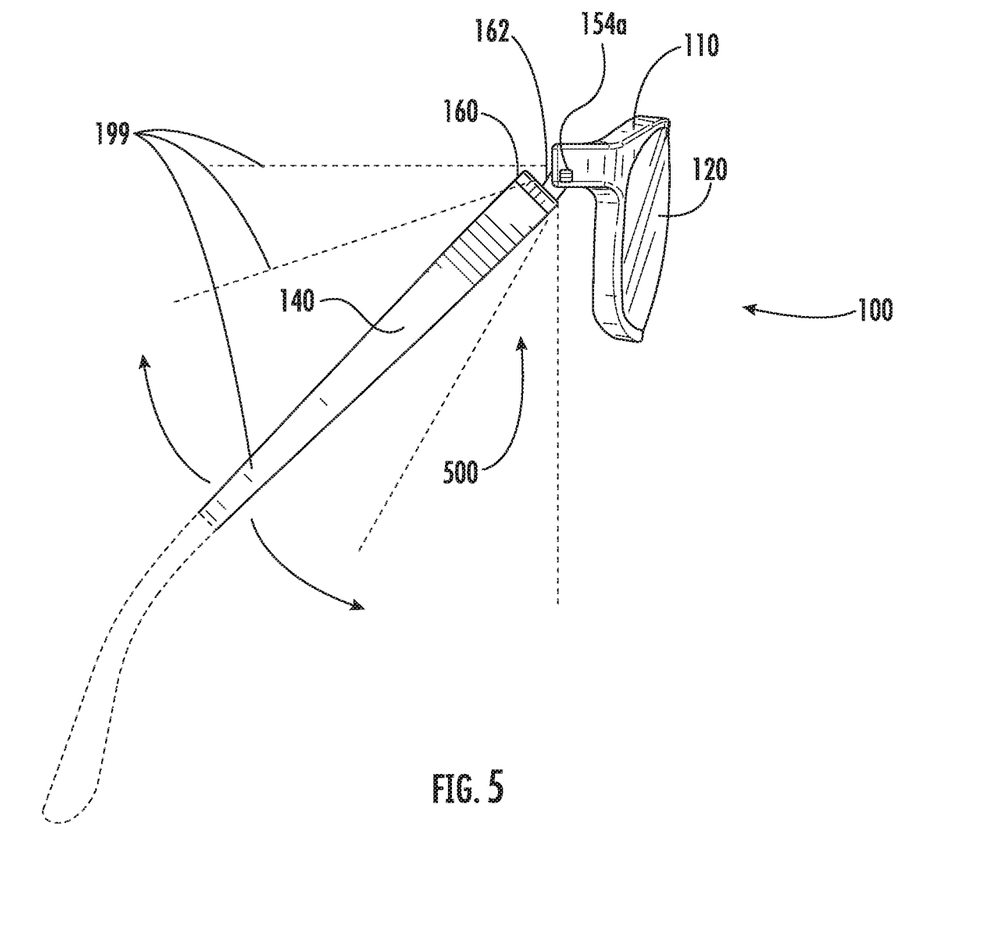
FIG. 5 shows a side view of the multiuse eyeglasses in a hybrid extended position.
Figure 6:
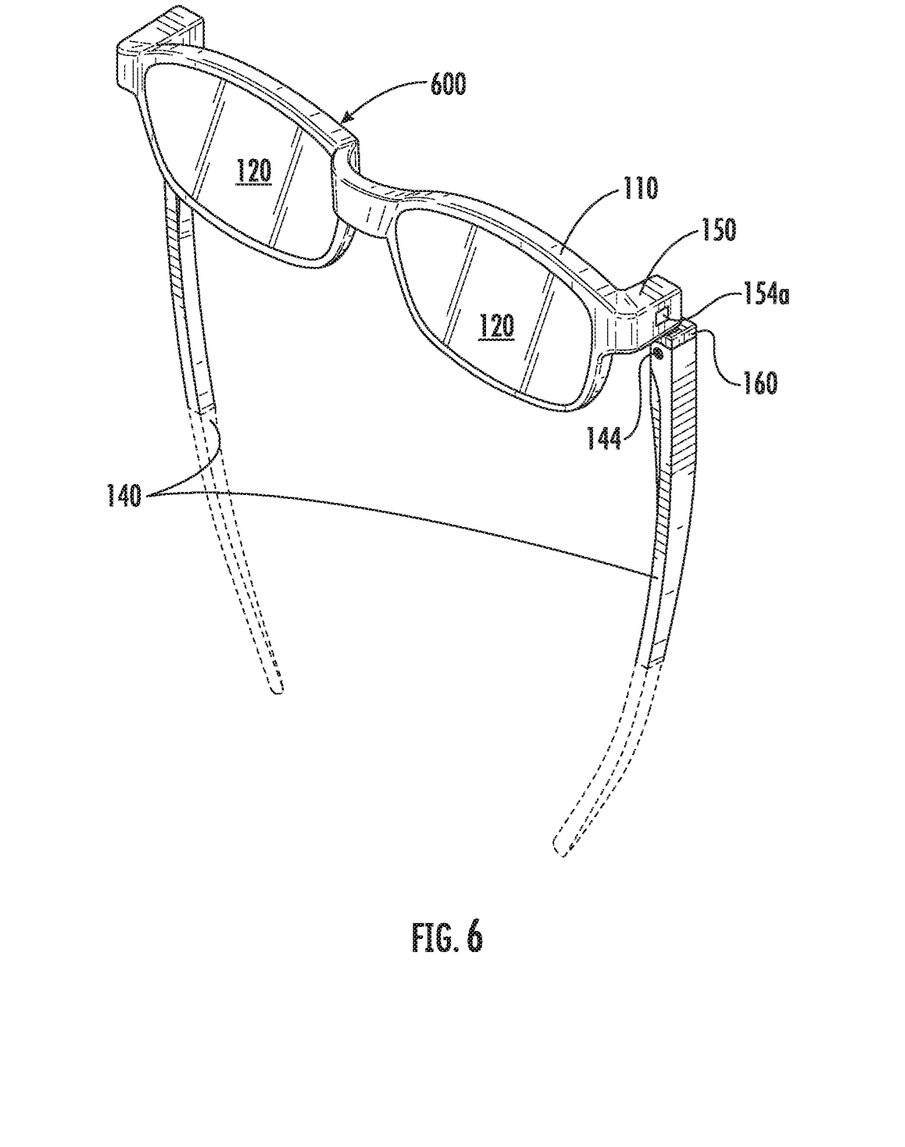
FIG. 6 shows a perspective view of the multiuse eyeglasses in a lorgnette extended position.
Figure 7:
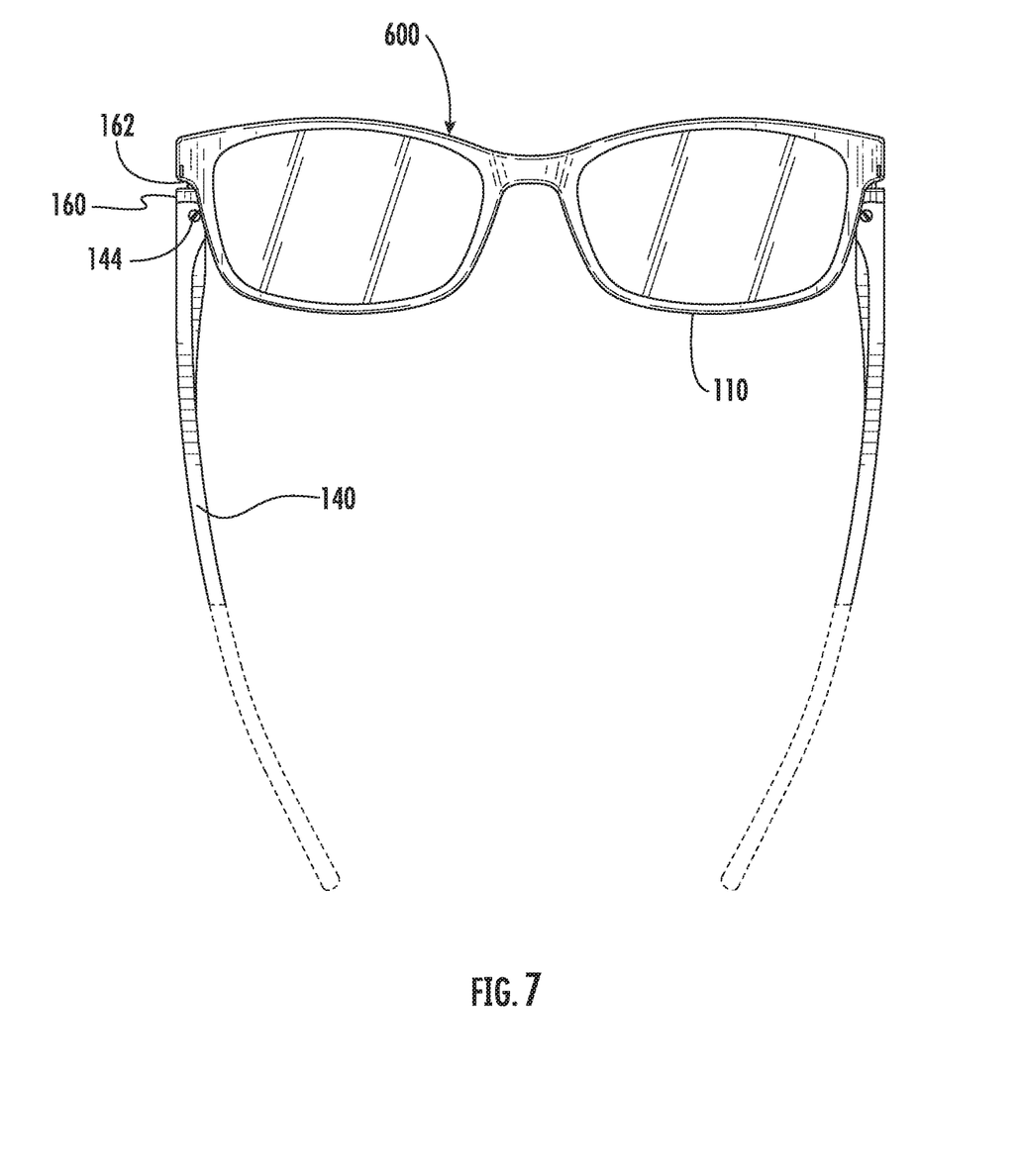
FIG. 7 shows a front view of the multiuse eyeglasses in a lorgnette extended position.
Figure 8:
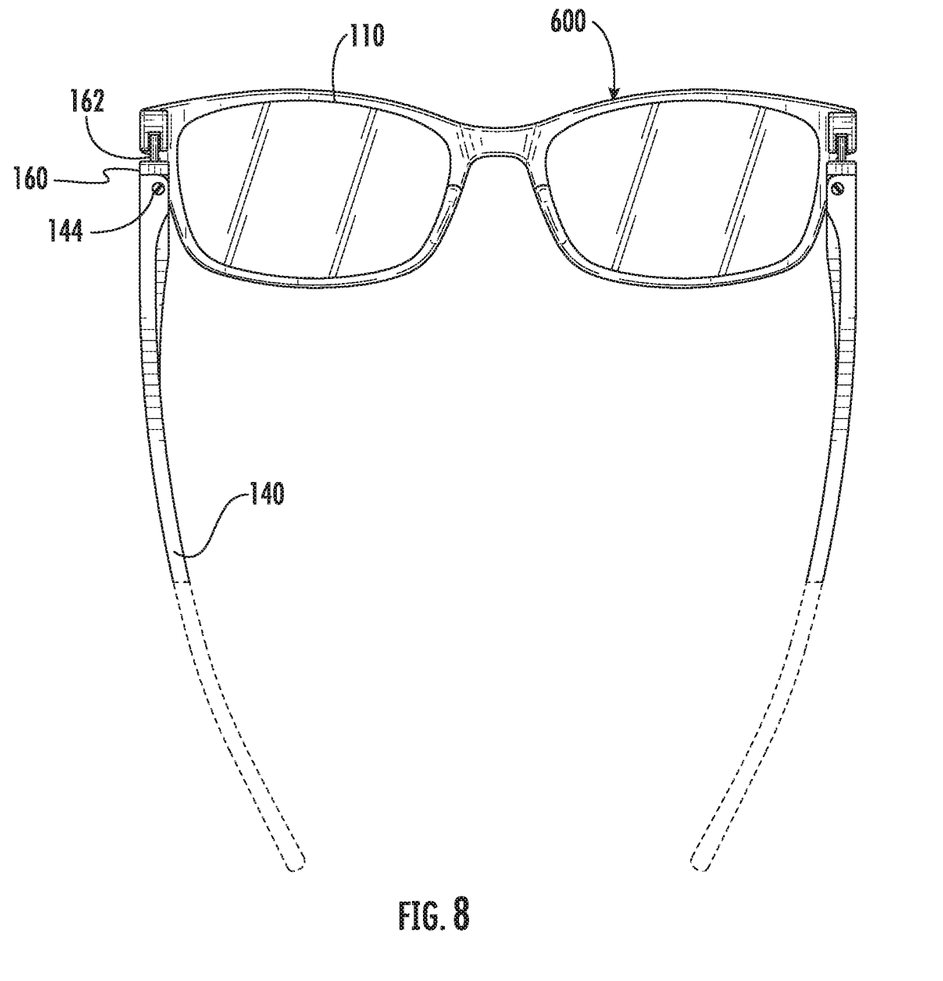
FIG. 8 shows a rear view of the multiuse eyeglasses in a lorgnette extended position.
Figure 9:
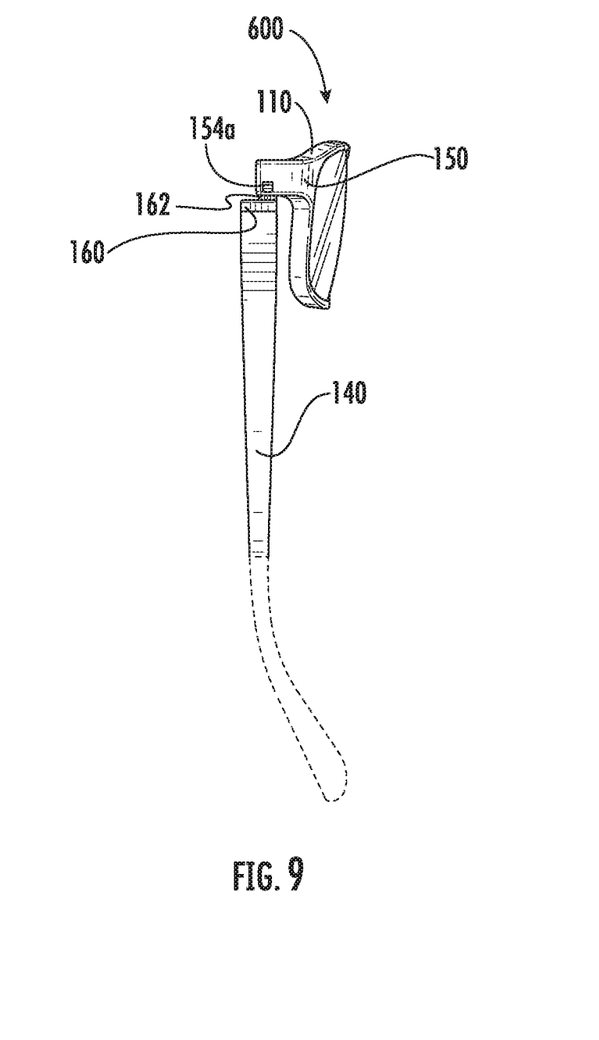
FIG. 9 shows a side view of the multiuse eyeglasses in a lorgnette extended position.

To assist in movement between distinct, i.e., not fluid movement, multiple predetermined arm positions 199 shown in phantom in FIG. 5, the hinge element frame engagement portion 162 may include teeth 162a and the frame 110 may have a frame biasing spring receiving hole 181 that receives a frame biasing spring 191 that biases a tooth engaging pin 192 with a biasing head 193. The frame biasing spring 191 biases the biasing head 193 against the hinge element's 160 teeth 162a such that the teeth 162a engage within the biasing head 193 to hold the arms in one of the multiple positions 199 about the second axis of rotation 152 and provide an audible "click" so the user knows how many clicks from the terminal traditional or lorgnette configuration they moved the arms 140 relative to the frame 110. Both hinge elements 160 for each of the arms 140 would have the same number of teeth and teeth spacing, which would ensure that the arms 140 on each side of the frame 110 would be at the same angle so the glasses wear evenly.

It should be appreciated that any angle of the arms 140 relative to the frame 110 may be possible, and not solely those that are noted when the biasing head 193 is engaged between teeth 162a. Thus, all positions of the arms 140 may be possible through their range of motion shown in FIG. 3. This allows for the wearer to tilt the frame 120 to their convenience at any angle. This all-angle possibility may be possible, and prevent the arms 140 from free movement (which would be inconvenient to the wearer, who would not want their frames freely moving during use), because the frame hinge receiving slot 151 is sized to engage the hinge element 160's frame engagement portion 162 in a press fit. This press fit holds the hinge element 160 and thus also the arms 140 relative to the frame 110 to prevent motion between therebetween. The pivot screw 154 and internally threaded not 154a may be tightened to further prevent unwanted motion of the arm 140 relative to the frame 110, but of course not so tight that a wearer cannot move the frame 110 and arms 140. The same press fit engagement may be possible between the hinge element arm engaging portion 164 and the hinge receiving channel 141, which may be also be tightened further using the arm pivot screws 144. Thus, at rest and under slight pressure exerted during wear, the arms 140 and frame 110 do not move relative to each other and a wearer's view is consistent.

Although the glasses 100 described herein have been described with spring elements, these elements are not required and thus removal of the frame biasing spring receiving hole 181, frame biasing spring 191, tooth engaging pin 192, arm biasing spring receiving holes 185, arm biasing springs 186, a cam engaging pin 187, and teeth 162a, as well as the cam shapes on either of the hinge element arm engagement portion 164 and frame engagement portion 162 are not necessary to achieve the functionality of moving the arms 140 relative to the frames 110 between the traditional, folded, and lorgnette configurations. For simplicity of manufacture, in fact, such configurations may be advantageous. Furthermore, it should be appreciated that only some of these may be removed (such as those elements in the arm) while others may be retained.

At this point, one feature of the glasses 100 may be appreciated. Looking at FIG. 5, the glasses 100 may be worn in a hybrid configuration 500. This may occur when a wearer wants to look over the glasses 100 and/or down below at something they are reading. Further, it is possible to adjust the frame 110 relative to the arms 140 while the wearer is wearing the glasses, that is, it is not necessary to remove the glasses 100 to adjust the angle of the lenses 120 to the wearer's eyes.

Returning to the details of the eyeglasses 100, the tooth engaging pin 192 may have a slightly larger head than its corresponding pin body, and this head pushes against the frame biasing spring 191 and also is stopped by a frame shelf 194 within the frame 110.

For traditional arm and frame engagement feel, the hinge element arm engagement portion 164 may include a cam 164a. and the arms may have arm biasing spring receiving holes 185 that receive arm biasing springs 186 that bias a cam engaging pin 187 against the cam 164a such that the arms 140 have a cam-biased movement between a folded configuration 200 and an extended configuration 300 as the arms rotate about the first axis of rotation 142. Movement of the arms 140 in this way would be familiar to most eyeglass wearers.

Due to arrangement of the parts as discussed herein, the arms 140 may not move upwards from that shown in FIG. 2 or outwards away from the lenses 120 further than that shown in FIG. 4.

The figures show a single style of eyeglasses, but it should be clear that metal frames, frames with different shapes, and other material choices would be possible. Further, this design may have particular advantages in sunglasses, where the user may want to lower the frames in the hybrid configuration while wearing them in order to read their phone or see something in a darker space.

While the invention has been described with reference to the embodiments above, a person of ordinary skill in the art would understand that various changes or modifications may be made thereto without departing from the scope of the claims.

The invention claimed is:

1. Multiuse eyeglasses comprising:
a frame that holds two lenses; and
arms that extend from the frame, each arm having a first axis of rotation that is generally perpendicular to each arm and a second axis of rotation that is orthogonal to the first axis of rotation and allows each arm to be rotated downwards relative to the frame, wherein all positions about the second axis of rotation are possible between a traditional configuration for traditional eyeglass wear and a configuration with the arms rotated downwards; and
hinge elements that join the frame to the arms, wherein the hinge elements comprise a frame engagement portion that engages the frame and an arm engagement portion that engages the arms, wherein the frame includes hinge receiving slots that receive the frame engagement portions in a press fit, wherein the arms include hinge receiving channels that receive the arm engagement portions in a press fit, wherein the frame further includes frame pivot receiving holes that receive frame pivot fasteners that define the second axes of rotation and the arms further include arm pivot receiving holes that receive arm pivot fasteners that define the first axes of rotation.

2. The multiuse eyeglasses of claim 1, wherein the frame pivot screws are received in internally threaded nuts that extend into nut receiving channels.

3. The multiuse eyeglasses of claim 1, wherein the hinge elements include frame pivot screw receiving holes that receive the frame pivot screws, and further include arm pivot screw receiving holes that receive the arm pivot screws.

4. The multiuse eyeglasses of claim 1.

5. Multiuse eyeglasses comprising:
a frame that holds two lenses; and
arms that extend from the frame, each arm having a first axis of rotation that is generally perpendicular to each arm and a second axis of rotation that is orthogonal to the first axis of rotation and allows each arm to be rotated downwards relative to the frame, wherein all positions about the second axis of rotation are possible between a traditional configuration for traditional eyeglass wear and a configuration with the arms rotated downwards; and
hinge elements that join the frame to the arms, wherein the hinge elements comprise a frame engagement portion that engages the frame and an arm engagement portion that engages the arms, wherein the hinge element frame engagement portions include teeth;
wherein the frame further includes frame biasing spring receiving holes that receive frame biasing springs that bias tooth engaging pins, wherein the frame biasing springs bias a biasing head on the tooth engaging pins against the hinge elements' teeth such that the teeth engage the biasing head when the moves between the teeth to produce an audible noise.

6. The multiuse eyeglasses of claim 1, wherein the arms are prevented from moving outwards rotation about the first axis of rotation in the traditional use prevented.

7. The multiuse eyeglasses of claim 1, wherein upwards rotation of each arm about the second axis of rotation beyond a traditional configuration is prevented.

8. Multiuse eyeglasses comprising:
a frame that holds two lenses; and
arms that rotate downwards relative to the frame from a traditional configuration but are prevented from upwards movement of each arm relative to the frame, wherein all positions are possible between the traditional configuration for traditional eyeglass wear and a configuration with the arms rotated downwards; and
hinge elements that join the frame to the arms, wherein the hinge elements comprise a frame engagement portion that engages the frame and an arm engagement portion that engages the arms, wherein the frame includes hinge receiving slots that receive the frame engagement portions in a press fit, wherein the arms include hinge receiving channels that receive the arm engagement portions in a press fit, wherein the frame further includes frame pivot receiving holes that receive frame pivot fasteners that define a second axes of rotation that allows each arm to be rotated downwards relative to the frame, and the arms further include arm pivot receiving holes that receive arm pivot fasteners that define a first axes of rotation that is generally perpendicular to each arm.

9. The multiuse eyeglasses of claim 8, wherein the arms are prevented from moving beyond an extended configuration around the first axis of rotation.

10. The multiuse eyeglasses of claim 9, wherein a biasing mechanisms includes a spring and pin that engage the hinge elements, wherein the biasing mechanism biases the arms in a predetermined direction.

11. The multiuse eyeglasses of claim 10, wherein each pin includes a head that engages teeth on the hinge elements.

* * * * *